(12) United States Patent
Klosterman et al.

(10) Patent No.: US 6,574,001 B2
(45) Date of Patent: *Jun. 3, 2003

(54) MANAGING FONT DATA IN A PRINT JOB

(75) Inventors: Elliot Lee Klosterman, Boise, ID (US); Shane Konsella, Boise, ID (US); Chris R. Gunning, Boise, ID (US); Nolan Glen Rosenbaum, Boise, ID (US)

(73) Assignee: Hewlett-Packard Development Co., L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/304,816

(22) Filed: May 4, 1999

(65) Prior Publication Data
US 2002/0181001 A1 Dec. 5, 2002

(51) Int. Cl.[7] .............................................. G06K 15/00
(52) U.S. Cl. ...................................... 358/1.11; 358/1.18
(58) Field of Search .......................... 358/1.1, 1.2, 1.11, 358/1.16, 524, 1.18; 345/551, 557, 25–26; 711/118, 119, 120, 121, 122, 123, 124, 133

(56) References Cited

U.S. PATENT DOCUMENTS 5,883,640 A * 3/1999 Hsieh et al. ................ 345/503

* cited by examiner

Primary Examiner—Arthur G. Evans

(57) ABSTRACT

A method and a system are used to manage fonts in print jobs with more than one context where at least some of the contexts include text strings. Print jobs may be divided into portions, called contexts, so that they are easier for a print manager to manage. These larger contexts are called graphic sets. Each of these graphic sets is sent to the printer driver consecutively. Each text string has a font associated with it. The font data for each text string is read from the operating system and cached into memory at the time each string is received by the printer driver. After all individual text strings elements of a given graphic set have been received by the printer driver, the context is stored and the cached fonts are stored with the context. After all of the contexts of the print job have been received by the printer and stored, each context is restored and rendered. The graphics sets may be restored in any order. The fonts stored with a context are also restored when the context is restored.

20 Claims, 1 Drawing Sheet

MANAGING FONT DATA IN A PRINT JOB

FIELD OF THE INVENTION

This invention relates in general to fonts used in a printer and, more particularly, to a system and method for managing font data for a print job by printer driver software.

BACKGROUND OF THE INVENTION

Often a True Type font used in a document is not part of the standard set of True Type fonts found in a printer. Therefore, the True Type font must be downloaded to the printer before it may be printed. Downloading the font involves sending to the printer most of the standard tables in a True Type font as well as individual glyph definitions used to draw characters referenced in the text of the document. The amount of data in True Type tables that is required by the True Type rasterizer in the printer can exceed 30 Kilobytes for Latin based fonts or 1 Megabyte for Asian fonts. If a document references tens of True Type fonts, the amount of data becomes substantial and must be adequately managed.

Print jobs are often passed to printer drivers one graphic element at a time. Printer drivers are software modules that provide an interface typically between an operating system (OS) element (in Windows, a graphics device interface or GDI) and a printer connected to the computer. The purpose of a printer driver is to receive from the operating system, elements to print and to translate them to a language understood by the printer. The data associated with each element passed to the printer driver, for example a text string and its associated font, is often only valid within the context of the current GDI call to the driver.

Some printer drivers now support deferred printing where the rendering (translation to printer language) of a given graphic is delayed to a context (i.e. time) different than the context the graphic elements are sent in. However, generally it is not possible to retrieve font data from a host system outside of context of the Windows GDI call in which the text and font reference is passed. This is particularly true in Windows NT 4.0 printer drivers. One possible solution to this problem is to cache all font data explicitly and entirely for each reference to each font used in the print job. However as discussed above, this could take up quite a lot of memory. When memory is in high demand, storing all of the font data for all of the fonts in a print job is not an adequate solution.

SUMMARY OF THE INVENTION

According to principles of the present invention, a method and a system are used to manage fonts in print jobs with more than one context where at least some of the contexts include text strings. Print jobs may be divided into portions, called contexts, for example, pages, so that they are easier for a print manager to manage. These larger contexts, i.e. groupings of individual job elements, are herein referred to as graphic sets. Each of these graphic sets is sent to the printer driver consecutively. Each text string has a font associated with it. The font data for each text string is read from the operating system (OS) and cached into memory at the time each string is received by the printer driver. After all individual text string elements of a given graphic set have been received by the printer driver, the context is stored and the cached fonts are stored with the context. After all of the contexts of the print job have been received by the printer and stored, each context is restored and rendered. The graphic sets may be restored (i.e. played back) in any order. The fonts stored with a context are also restored when the context is restored.

According to further principles of the present invention, information that is determined to no longer be needed is purged after the font information is stored and before the next context is received by the printer. Cached font information is also purged after each print job graphic set has been played back and rendered.

Other objects, advantages, and capabilities of the present invention will become more apparent as the description proceeds.

DETAILED DESCRIPTION OF THE INVENTION

Figure 1:
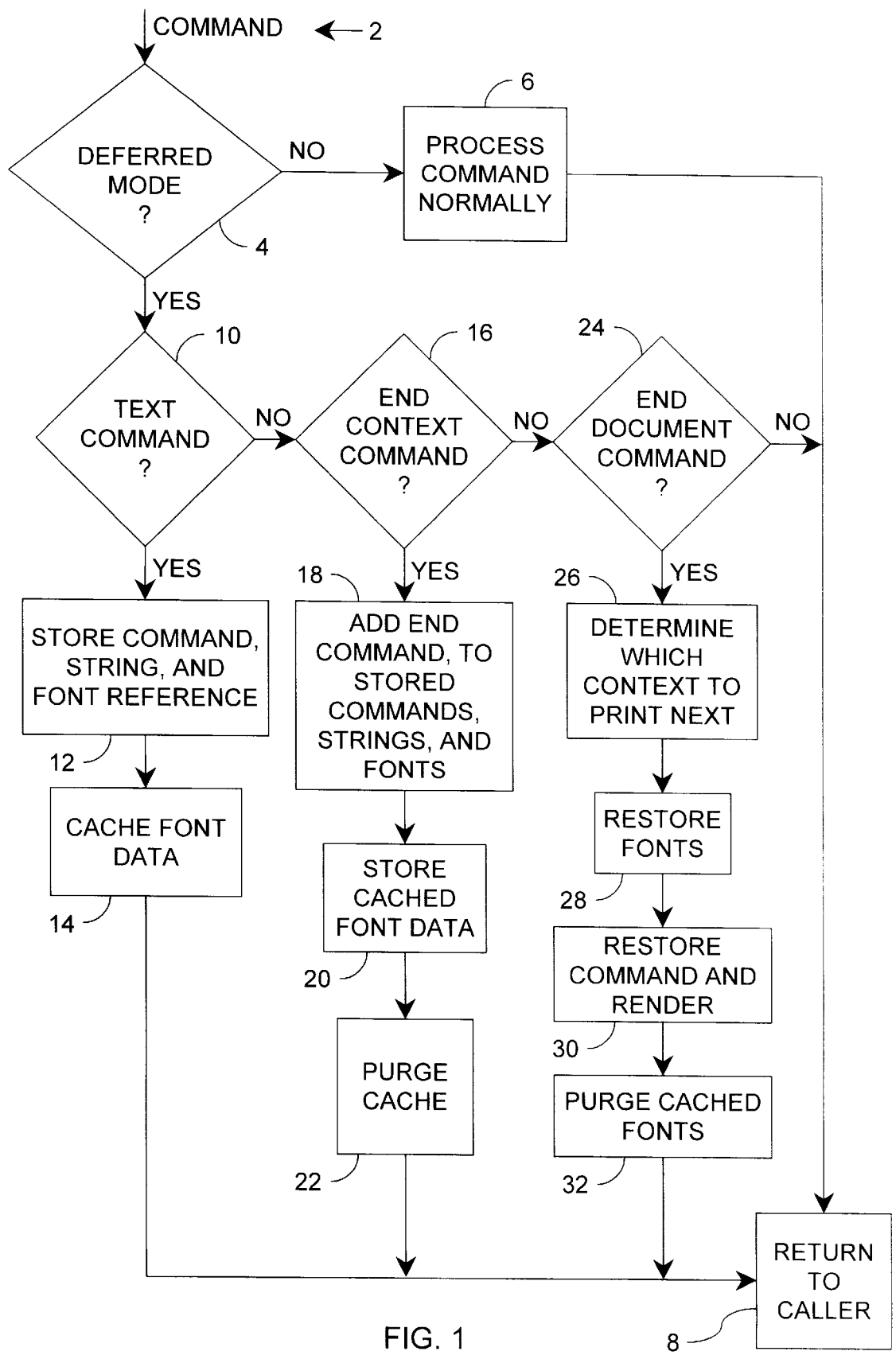
FIG. 1 is a flow chart depicting one embodiment of the method of the present invention.

FIG. 1 illustrates one embodiment of the method of the present invention. A command 2 is issued by a caller to the printer driver. A print job is made up of a series of commands. These commands are interpreted and executed by the printer driver and passed on to the printer in rendered form resulting in the completed print job. A caller is the application or operating system (OS). The caller creates the commands that make up the print job.

A determination is first made 4 whether the printer driver is operating in deferred printing mode. A deferred printing mode delays the rendering of a given graphic set to a context different than the context the graphic set was sent in. Either a user or a software application used by the user to print the document decides whether the printer driver is to print in deferred mode. That decision is passed on to the printer driver.

If deferred mode printing has not been selected, the command 2 is processed 6 in the conventional manner. The printer then returns 8 to the caller and asks for the next command 2.

If deferred mode printing has been selected, the command 2 is examined 10 to determine whether it is a text command. Text commands are those commands in a print job that instruct the printer to print a text string. Each text command is accompanied with the string of text to be printed and the font in which the text string will be printed. If the command 2 is a text command, then command 2, the text string associated with command 2, and the font associated with the text string are stored 12. The font stored with the text string is understood to be a reference (or handle) to the font used for the string. The actual data for the font is read as needed from the OS and cached 14. The font data may be cached 14 to any sort of storage device capable of acting as a cache for data. Preferably, the font data is cached 14 to memory. The font data is cached 14 so that subsequent text commands in the current graphic set that use the same font need only reference the font. Only one copy of each font's data is cached 14. The multiple text commands that use a given font all share the font data.

Storing 12 the font with the string also includes caching the font data for the font, caching a handle for a font implementation of the font, and adding a reference to the font implementation into a persistent font database. For a True Type font, the font data includes the True Type font table data and character data. If the font data has already been cached and is still in memory, the font data is updated if necessary to print the text string. The font data is incrementally aged every time it is updated.

The font stored with the text string contains very little data. The data, which actually describes the font characteristics (e.g. weight, style, orientation, etc.), is recorded in a font implementation. Font implementations are shared font resources created by the printer driver that are managed separately from fonts. The font stored with the text string simply contains a handle to the appropriate shared font implementation. Additionally, the font implementations contain a handle to a font file representation (or software abstraction) that represents the font file data retrieved from the OS at the time text command was received. This abstraction has interfaces to retrieve the font data. A handle is assigned to each font file representation and each font implementation when these resources are created by the printer driver. After caching 12, the printer driver returns 8 to the caller and asks for the next command 2.

If the command is not a text command, command 2 is analyzed 16 to determine whether it is an end context or "graphic set" (for example, end page) command. An end context command is a command that signals the printer driver that all of the commands 2 have been transferred for the context. If command 2 is an end context command, all of the text commands, strings, and fonts for the context (graphic set) have already been stored and the end command is added 18 to that storage. The commands, strings, and fonts may be stored to any sort of storage device capable of storing data. Preferably, command 2, the string, and the font are stored to a storage media such as a hard drive.

Now that all of the command data for the current context or graphic set has been stored, the previously cached 14 font data is stored 20. The cached font data includes two fundamental pieces, the font implementations and the font file representations. Font implementations are shared by multiple fonts and font file representations are shared by multiple font implementations. The sharing reduces the amount of cached font data. Storing 20 the cached font data then involves discovering the quantity of unique font file representations used in the context, storing the table and glyph data associated with each unique font file representation, and storing the handle associated with the font file data. Subsequently, the count of unique font implementations is determined, a copy of each unique font implementation is stored, and finally the handle assigned to the font implementation as well as the handle of the font file representation that the font implementation uses are stored. Storing the font file representations first and then the font implementations is important to the play back process.

In order to free up space for caching additional commands 2, text strings, and fonts, the storage device used for caching is purged 22 of all commands 2, text strings, and fonts that are not expected to be needed for the next context. After the storage device has been purged, the printer returns 8 to the caller and asks for the next command 2.

If command 2 is not an end context command, command 2 is analyzed 24 to determine whether it is an end document (end print job) command. If command 2 is not an end document command, the printer returns 8 to the caller and asks for the next command 2.

If command 2 is an end document command, the process of rendering the contexts (graphic sets) begins. In an alternate embodiment, the rendering may be performed at even a much later time, for example when a supporting a job retention feature. The contexts may be rendered in any order. Either the user or the application used by the user for printing the document control the order in which the contexts will be printed. The order of context playback may be determined by convention. For example, if booklet printing is the feature being used, the pages must be played back in an order determined by the number of pages received and the ordering necessary to achieve the booklet effect. Alternatively, the order could be communicated to the printer driver using control commands in the print job. The printer driver determines 26 which context will be rendered next based either on the predetermined information or control commands in the print job.

Next, the fonts for the determined context are restored 28. The restoration 28 of fonts preferably proceeds in a specific order. First, the font file data associated with font file representations are read into memory from the font data storage. As discussed above, each font file representation has a unique handle or identifier associated with it.

Once the font file representations have been restored, the font implementations are restored and are linked to the appropriate font file representation memory image using the font file handle saved with the font implementation. This linking process makes available to the font implementations and subsequently to restored fonts, the specific font table and glyph data needed.

Once the font implementations are read back into memory and linked appropriately, the command data for the context can now be played back for rendering 30. Each command is now read into memory, one at a time. Each text command read back, has string characters and a handle to the correct font implementation. A new font is created and linked to the memory image of the appropriate font implementation. The newly created font now has access to all necessary font data to print the text in the printer. Each chosen context is self-contained with respect to all data, particularly font data, which had to be retrieved from the OS at the time the text command originally came into the driver. The playback of the command data occurs entirely separately from the OS.

The selected context is then processed (rendered) in any conventional manner. In order to free up space for restoring additional contexts, commands 2, text strings, and fonts, memory is purged 32 of all contexts, commands 2, text strings, and fonts that are not expected to be needed for rendering the next context. After memory has been purged, the printer driver restores the next required context and continues to loop 34 until all contexts in the print job have been played back. Once the print job has been completed, all storage resources associated with the commands and fonts for all contexts are deleted and the printer driver returns 8 to the caller indicating that the print job is now complete.

The present invention allows a driver to manage font data in any context. The context could be one page, part of one page, or more than one page. Font data is efficiently shared between multiple text objects within a given or multiple contexts. The font data is correctly restored for printing the contexts in any order.

It should be understood that the foregoing description is only illustrative of the invention. Various alternatives and modifications can be devised by those skilled in the art without departing from the invention. For example, the functions performed by the printer driver could alternatively be performed within the printer itself. Accordingly, the present invention is intended to embrace all such alternatives, modifications and variances that fall within the scope of the appended claims.

Additionally, although the present invention has been described as a process, it should be understood that each of the steps of the process may be carried out using conventional devices suited to executing the steps of the process of the present invention. The present invention is intended to embrace the combination of the conventional devices suited to executing the steps of the process of the present invention.

What is claimed is:

1. A method for managing fonts in a print job having a plurality of contexts, the method comprising:
    (a) for each context of the print job, identifying each text command within the context, each text command having a text string and a reference to a font;
    (b) for each text command, storing the font reference and the text string;
    (c) storing each font referenced within each context;
    (d) identifying a context for processing;
    (e) restoring each font referenced within the identified context; and,
    (f) for each text command of the identified context, restoring each stored font reference and text string.

2. The method of claim 1 wherein storing each font includes:
    (a) caching font data for each font reference;
    (b) caching a handle for a font implementation of the font reference;
    (c) adding a reference to the font implementation of the font into a persistent font database; and,
    (d) storing the cached font data.

3. The method of claim 2 wherein storing the cached font data further includes:
    (a) discovering the quantity of unique font file representations used in the context;
    (b) storing table and glyph data associated with each unique font file representation; and,
    (c) storing a handle associated with the font data.

4. The method of claim 3 wherein each font file representation is associated with at least one font implementation and wherein storing the cached font data includes:
    (a) discovering a quantity of unique font implementations used in the context;
    (b) storing a copy of each unique font implementation; and,
    (c) storing a handle assigned to the font file representation associated with the font implementation and a handle assigned to the font implementation.

5. The method of claim 4 wherein restoring each stored font includes:
    (a) restoring the stored font data;
    (b) restoring the font file representations and each handle associated with the font data;
    (c) restoring the font implementations and the handles assigned to the font file representations and the handles assigned to the font implementations; and,
    (d) using the restored handles assigned to the font file representations, the handles assigned to the font implementations, and the handle associated with the font data to link each restored font to each font implementation and the restored font data.

6. The method of claim 2 further including, after storing the cached font data, purging selected cached font data.

7. The method of claim 1 further including, after storing each font, determining an order for restoring the contexts.

8. A system for managing fonts in a print job having a plurality of contexts, the system comprising:
    (a) means for identifying each text command within each context, each text command having a text string and a reference to a font;
    (b) means for storing the font reference and the text string of each text command;
    (c) means for storing each font referenced within each context;
    (d) means for identifying a context for processing;
    (e) means for restoring each font referenced within the identified context; and,
    (f) means for restoring each stored font reference and text string for each text command of the identified context.

9. The system of claim 8 wherein the means for storing the font includes:
    (a) means for caching font data for each font reference;
    (b) means for caching a handle for a font implementation of the font reference;
    (c) means for adding a reference to the font implementation of the font into a persistent font database; and,
    (d) means for storing the cached font data for each context.

10. The system of claim 8 wherein the means for storing the cached font data further includes:
    (a) means for discovering the quantity of unique font file representations used in the context;
    (b) means for storing table and glyph data associated with each unique font file representation; and,
    (c) means for storing a handle associated with the font data.

11. The system of claim 10 wherein each font file representation is associated with at least one font implementation and wherein the means for storing the cached font data includes:
    (a) means for discovering a quantity of unique font implementations used in the context;
    (b) means for storing a copy of each unique font implementation; and,
    (c) means for storing a handle assigned to the font file representation associated with the font implementation and a handle assigned to the font implementation.

12. The system of claim 11 wherein the means for restoring each stored font includes:
    (a) means for restoring the stored font data;
    (b) means for restoring the font file representations and each handle associated with the font data;
    (c) means for restoring the font implementations and the handles assigned to the font file representations and the handles assigned to the font implementations; and,
    (d) means for using the restored handles assigned to the font file representations, the handles assigned to the font implementations, and the handle associated with the font data to link each restored font to each font implementation and the restored font data.

13. The system of claim 9 further including means for purging selected cached font data.

14. The system of claim 8 further including means for determining an order for restoring the contexts.

15. A program storage device readable by a computer, tangibly embodying a program, applet, or instructions executable by the computer to perform method steps for managing fonts in a print job having a plurality of contexts, the method steps comprising:
    (a) for each context of the print job, identifying each text command within the context, each text command having a text string and a reference to a font;

(b) for each text command, storing the font reference and the text string;

(c) storing each font referenced within each context;

(d) identifying a context for processing;

(e) restoring each font referenced within the identified context; and, (f) for each text command of the identified context, restoring each stored font reference and text string.

16. The program storage device of claim 15 wherein the method step of storing the font includes:

(a) caching font data for each font reference;

(b) caching a handle for a font implementation of the font reference;

(c) adding a reference to the font implementation of the font into a persistent font database; and, (d) storing the cached font data.

17. The program storage device of claim 16 wherein the method step of storing the cached font data further includes:

(a) discovering the quantity of unique font file representations used in the context;

(b) storing table and glyph data associated with each unique font file representation; and, (c) storing a handle associated with the font data.

18. The program storage device of claim 17 wherein each font file representation is associated with at least one font implementation and wherein the method step of storing the cached font data includes:

(a) discovering a quantity of unique font implementations used in the context;

(b) storing a copy of each unique font implementation; and, (c) storing a handle assigned to the font file representation associated with the font implementation and a handle assigned to the font implementation.

19. The program storage device of claim 18 wherein the method step of restoring each stored font includes:

(a) restoring the stored font data;

(b) restoring the font file representations and each handle associated with the font data;

(c) restoring the font implementations and the handles assigned to the font file representations and the handles assigned to the font implementations; and, (d) using the restored handles assigned to the font file representations, the handles assigned to the font implementations, and the handle associated with the font data to link each restored font to each font implementation and the restored font data.

20. The program storage device of claim 16 wherein the method steps further include after storing the cached font data, purging selected cached font data.

* * * * *